United States Patent [19]

Farley

[11] 4,451,137

[45] May 29, 1984

[54] ADJUSTING COPIER COPY CONTRAST AND DENSITY DURING PRODUCTION RUNS

[75] Inventor: Ronald W. Farley, Rochester, N.Y.

[73] Assignee: Eastman Kodak Company, Rochester, N.Y.

[21] Appl. No.: 382,532

[22] Filed: May 27, 1982

[51] Int. Cl.³ ............................................ G03G 15/00
[52] U.S. Cl. .............................. 355/14 C; 355/14 SH; 355/3 R; 355/14 R; 355/14 E; 355/35 H; 355/14 CH
[58] Field of Search .................. 355/3 SH, 14 SH, 50, 355/3 R, 14 R, 14 C, 14 E, 14 D, 77, 3 DD, 14 CH; 271/3.1, 4

[56] References Cited

U.S. PATENT DOCUMENTS

| | | | |
|---|---|---|---|
| 4,179,215 | 12/1979 | Hage | 271/4 X |
| 4,294,536 | 10/1981 | Paxton | 355/14 C |
| 4,350,435 | 9/1982 | Fiske et al. | 355/14 C |
| 4,365,889 | 12/1982 | Silverberg | 355/14 SH |

Primary Examiner—A. C. Prescott
Attorney, Agent, or Firm—Norman Rushefsky

[57] ABSTRACT

Apparatus including a recirculating feeder and document positioner is coupled to a copier. The copier has variable contrast and density controls. Ordinarily, the document positioner directly feeds document sheets seriatim to the recirculating feeder tray. However, if a document sheet requires copier contrast or density adjustments, the document sheet is stopped at the copier exposure platen, adjustments made to the contrast and density controls and a copy is made. Further adjustments and copies are made until a proof copy having an acceptable contrast and density is produced. The document sheet is then delivered to the tray. A memory stores the location in the document of each stopped document sheet and the proof copy adjustment information. When all document sheets are in the tray, then the recirculating feeder, copier and memory operate to produce a production run with each copy sheet having acceptable contrast and density.

8 Claims, 6 Drawing Figures

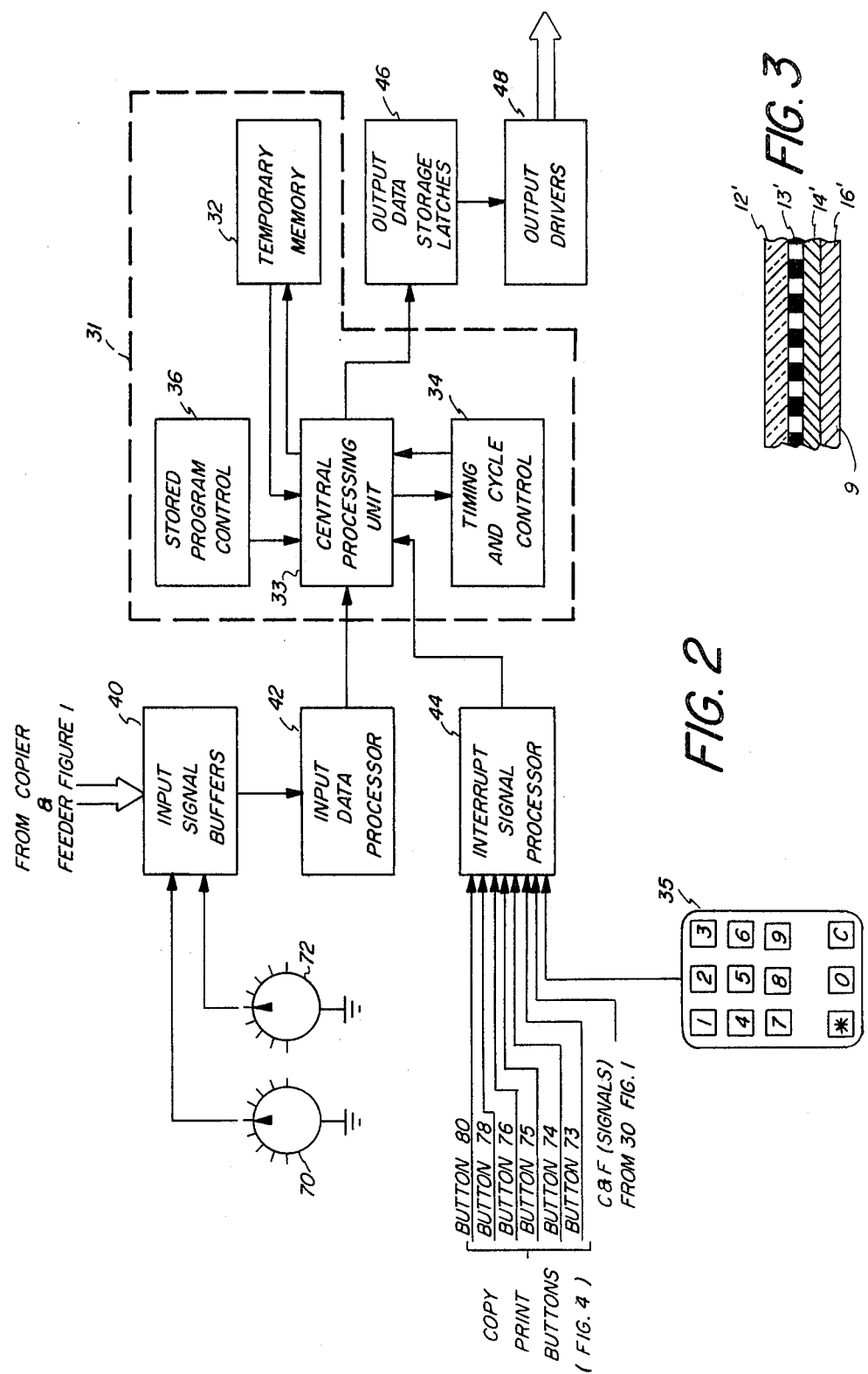

ADJUSTING COPIER COPY CONTRAST AND DENSITY DURING PRODUCTION RUNS

BACKGROUND OF THE INVENTION

1. Field of the Invention

The present invention relates to copiers having automatic document feeders which produce copies of multi-sheet documents.

2. Description of the Prior Art

High-speed copiers having automatic feeders are currently in use to produce copies. In one example, a recirculating feeder is coupled to a copier and causes the copier to make collated copies of a multi-sheet document. The recirculating feeder automatically feeds individual sheets in succession from the bottom of a document stack (a multi-sheet document in the feeder tray) to the exposure platen for copying and returns such sheet to the top of the document stack while maintaining the original orientation. After each sheet of a document stack has been fed once, the document stack can either be fed again or removed from the feeder. Since the copy sheets are delivered from the copier in the same order as the original document sheets, collation of the copy sheets by a sorter accessory is unnecessary.

Occasionally, a sheet of the document stack will have a contrast or density which when copied by the copier at its normal copy setting will produce a poor copy. The term contrast, as used herein, refers to the rate of change (or slope) of the copy reflective density (Dout) with respect to the original document reflective density (Din). In this case, the practice is to remove this document sheet from the document stack and copy it individually, making a good intermediate or master copy. The master copy is then returned to the appropriate position in the document stack and copying undertaken. A problem with this technique is that when the master copy is copied, (making a copy of a copy), image quality may be unavoidably degraded.

Another contrast and density control technique is set forth in commonly assigned U.S. patent application No. 137,149, entitled Copy Contrast and Density Control, filed Apr. 4, 1980 now U.S. Pat. No. 4,350,435 to Fiske et al and now U.S. Pat. No. 4,350,435. The disclosed apparatus adjusts copier process parameters to produce copies having improved copy contrast and density. A memory has a stored matrix array of sets of copier process parameter information, with each set having values which correspond to specific levels of Vo, Eo, and $V_B$ respectively. The operator designates a particular set. Means responsive to the values of the designated set change the exposure E produced by exposure lamps, the voltage Vo initially applied onto the surface of a photoconductor by a charger and the bias $V_B$ applied to an electrode of a development station to provide a copy having improved contrast and density.

In U.S. Pat. No. 4,294,536 to Paxton, apparatus is disclosed in which contrast and density of copies of selected document sheets of a multi-sheet document are adjusted during production runs without making master copies. Paxton discloses two techniques. In the first, before a production run, an operator manually enters into memory the copier process parameter information for controlling copying of a particular document sheet. In another disclosed technique, in order to enter this information into memory, a multi-sheet document is inserted into a recirculating feeder. Each document sheet is fed to the exposure platen and at least one copy is made of it. If the copy is satisfactory, the document sheet is returned to the tray. If not, copies are made until a proof copy with the acceptable contrast and density is made. Copier process parameter information for the proof copy as well as the sequential position of this document sheet in the multi-sheet document are then entered into memory and the document sheet returned to the stack. After this process is completed, the recirculating feeder is operated and copies are made. For each document sheet for which a proof copy was made, a copy in accordance with stored copier process parameter information is made with contrast and density as exhibited by the proof copy so that when the entire multi-sheet document is copied, all the copies have desired contrast and density.

Although the Paxton techniques represent a significant advance in the art, there remain opportunities for improvement. In the first technique, an operator must properly identify the page number of the document sheet before its process information is entered into memory. If he makes a mistake, this copier process information may be applied to the wrong sheet of the document. In the second technique, at least one copy must be made of each document sheet before a production run can be undertaken which adds time and expense.

SUMMARY OF THE INVENTION

In accordance with the present invention, there is provided a document feeder coupled to a copier having variable contrast and density controls. The feeder includes a document positioner and a recirculating feeder. An operator feeds document sheets one at a time from a multi-sheet document into the positioner. If an operator determines the copier will make a satisfactory copy of a document sheet at its "normal copy" setting, such sheet is directly delivered to the tray of the recirculating feeder. If, however, a document sheet has contrast and density such that the copier process parameters should be adjusted before a copy is made, an operator stops the sheet at the exposure platen, adjusts the contrast and density controls and makes an output or proof copy. The adjustments are varied until a proof copy exhibiting acceptable contrast and density is produced. The copier process parameter information corresponding to the proof copy as well as the sequential position of the sheet in the document are entered into memory. The document sheet is then delivered to the tray. This process is continued until all the sheets of the multi-sheet document are in the tray. The recirculating feeder is then operated in the same manner disclosed in the Paxton patent to produce copy sets.

DESCRIPTION OF THE DRAWINGS

FIG. 2 is a block diagram of the logic and control unit shown in FIG. 1;

FIG. 3 shows an enlarged cross-section of the photoconductive web of FIG. 1, which includes an integral screen;

DESCRIPTION OF THE PREFERRED EMBODIMENT

To assist in understanding the present invention, it will be useful to consider an electrophotographic copier having a logic and control unit (LCU 31), and a document feeder. Whenever the term "document sheet" is used, it refers to particular mediums such as sheets having images to be copied. The term "document" refers to a plurality of document sheets that are to be copied during a production run. The term "copy" refers to the output of the copier such as a copy sheet having a fixed toner image. A copy set is a plurality of copy sheets that correspond in page sequential order to the sheets of a document. A production run is a plurality of copy sets produced from a multi-sheet document.

Feeder Apparatus

Figure 1:
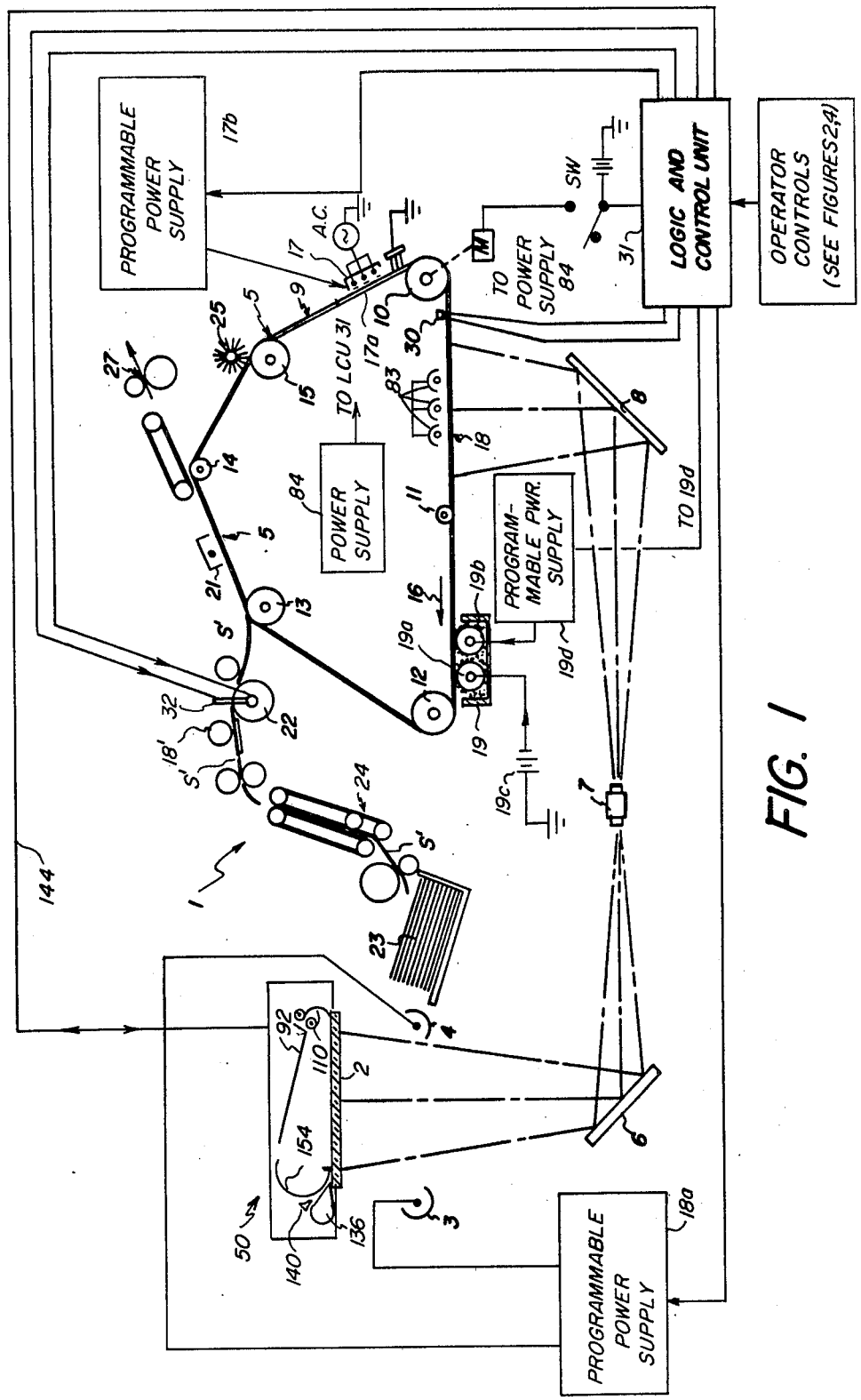
FIG. 1 is a schematic showing a side elevational view of a copier, document feeder, and a logic and control unit in accordance with the invention.
Figure 5:
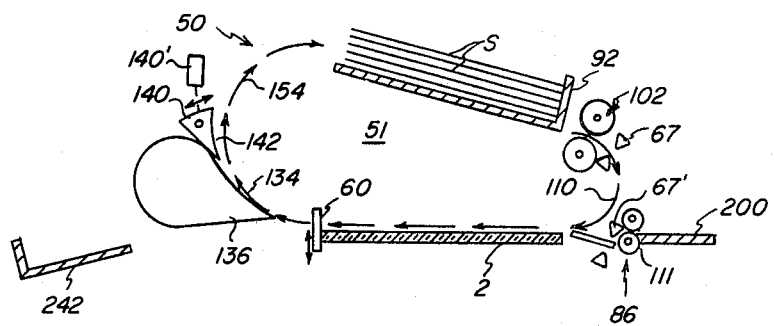
FIGS. 5-6 diagrammatically illustrate various modes of operation of the document feeder.
Figure 6:
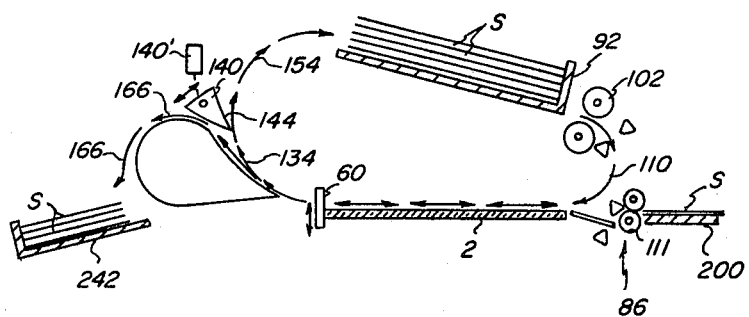

FIGS. 1, 5–6 show a document sheet feeding apparatus 50 including a recirculating feeder 51 and document positioner 86. The feeder apparatus 50 is used with a copier 1 having an exposure platen 2 at which document sheets are positioned for copying of information on one or both sides of the sheets. The recirculating feeder has a tray 92 for supporting a document at a location spaced from the platen 2. Guides in the feeder define a recirculating sheet path 110, 134, 154 extending from the tray 92 to the platen and back to the tray 92. A non-recirculating sheet path extends from the positioner tray 200 to the platen 2 and from the platen along path 134, 154 to the tray 92. The two sheet paths are at least partially coextensive in the area of the platen and the area where the sheets are fed to the tray. The feeder apparatus 50 is similar to that disclosed is shown in commonly assigned U.S. Pat. No. 4,176,945 issued Dec. 4, 1979 to Holzhauser et al, the disclosure of which is incorporated by reference herein.

FIGS. 5–6 diagrammatically illustrate three different modes of operation of the feeder apparatus of the invention. FIG. 5 shows the simplex mode of operation of the recirculating feeder wherein only one side of each document sheet S is to be copied. In such instance, the document sheets S are positioned in the tray 92 with the information to be copied facing upwardly, with the document sheets in their normal order, and with the topmost sheet being the first sheet of the document. A rotatable solenoid 140' which is connected to a sheet diverter 140 is energized in response to a signal from the LCU 31 and rotates the diverter clockwise to the position illustrated in FIG. 5. Thereafter, in response to a signal from the LCU 31, the lowermost document sheet is withdrawn from the bottom of the stack by means of an oscillating vacuum device 102 and fed through the path 110 onto the exposure platen 2. For a more complete disclosure of the tray 92 and device 102, see the aforementioned U.S. Pat. No. 4,176,945. Block or registration gate 60 stops and registers the document sheet S at the exposure platen. As shown in FIG. 1, when energized, two xenon flashlamps 3 and 4 flash illuminate the registered document sheet S at the exposure platen. For a specific disclosure of a typical exposure station, see commonly assigned U.S. Pat. No. 3,998,541, issued Dec. 31, 1976. By means of an object mirror 6, lens system 7, and an image mirror 8, an image of the illuminated document is optically stopped on discrete image areas of a moving photoconductor shown as a photoconductive web 5. After a document sheet is illuminated, the block 60 is withdrawn from the path of travel and the document sheet is then driven from the platen in the same direction, that is, from right to left, through the sheet paths 134 and 154 back onto the top of the stack of document sheets in the tray 92. This cycle continues until the required number of sets of copies has been made, as determined by a set counter (not shown) in the LCU 31.

FIG. 6 illustrates the second mode of operation which uses the document positioner 86. When document sheets are to be copied by means of the document positioner 86, a document sheet is fed across tray 200, into the nip of rotating rollers 111 which deliver it to the platen 2 where it is registered by the block 60. After one or more copies of the document sheets are made, the block 60 is raised, and the drive rollers (not shown) drive the document sheet from the platen and partially through the path 134. In this second mode, the solenoid 140' is de-energized and sheet diverter 140 is rotated counterclockwise to the position illustrated in FIG. 6. The document sheet is directed along the path 166 and the document sheet is delivered to a tray 242. Although the operation of the document positioner has been specifically described in connection with the copying of simplex original documents, it will be apparent that duplex documents can be copied by operating the apparatus as described in the aforementioned U.S. Pat. No. 4,176,945.

In the third mode of operation, the sheet diverter 140 is in the position illustrated in FIG. 5, and a document sheet fed by the positioner is delivered from sheet path 134 to sheet path 154 and into the tray 92. This third mode will be described in detail in the section entitled set-up.

Copier and Photoconductive Web

FIG. 3 illustrates a partial cross-section of the photoconductive web 5 which includes a transparent support 12', a screen 13', a conductive layer 14', and a photoconductive layer 16'. The support 12' provides mechanical strength to the other layers of the web and makes it suitable for use in electrophotographic copying machines. For a more complete description of the photoconductor web 5 and its screen see commonly assigned U.S. Pat. No. 4,294,536 to Paxton.

Returning to FIG. 1, the web 5 is trained about six transport rollers 10, 11, 12, 13, 14, and 15, thereby forming an endless or continuous belt. For more specific disclosures of such transport rollers, see commonly assigned U.S. Pat. Nos. 3,615,406 and 3,615,414, both issued Oct. 26, 1971. Roller 10 is coupled to a drive motor M in a conventional manner. Motor M is connected to a source of potential V when a switch SW is closed by a logic and control unit (LCU) 31. When the switch SW is closed, the roller 10 is driven by the motor M and moves the web 5 in clockwise direction as indicated by arrow 16. This movement causes successive image areas of the web 5 to sequentially pass a series of electrophotographic work stations of the copier.

For the purpose of the instant disclosure, several copier work stations are shown along the web's path. These stations will be briefly described.

First, a charging station 17 is provided at which the photoconductive surface 9 of the web 5 is sensitized by applying to such surface an electrostatic charge of a predetermined voltage. The station 17 includes an A.C. corona charger shown as a three wire A.C. charger. The output of the charger is controlled by a grid connected to a programmable power supply 17B. The supply 17B is in turn controlled by the LCU 31 to adjust the voltage level Vo applied onto the surface 9 by the charger 17. For an example of digital regulation of a corona charger, see U.S. Pat. No. 4,166,690.

As previously described, at exposure station 18, an inverse light image of a document sheet S is projected onto the photoconductive surface 9 of the web 5. The projected image dissipates the electrostatic charge at the light exposed areas of the photoconductive surface 9 and forms a latent electrostatic image. A programmable power supply 18A, under the supervision of the LCU 31, controls the intensity or duration of light from lamps 3 and 4 to adjust the exposure level E incident upon the web 5. For a specific example of such an exposure station and programmable power supply, see commonly assigned U.S. Pat. No. 4,150,324, issued Aug. 8, 1978 to Seil.

A dual magnetic brush developing station 19 includes developer which may consist of iron carrier particles and electroscopic toner particles with an electrostatic charge opposite to that of the latent electrostatic image. Developer is brushed over the photoconductive surface 9 of the web 5 and toner particles adhere to the latent electrostatic image to form a visible toner particle, transferable image. The dual-magnetic brush station 19 includes two rollers, a transport roller 19A, and a developer roller 19B. As is well understood in the art, each of the rollers 19A and 19B include a conductive (non-magnetic) applicator cylinder which may be made of aluminum. For an example of a dual-magnetic brush station, see commonly assigned U.S. Pat. No. 4,279,942 issued July 21, 1981 to Swapceinski. In the disclosed embodiment, conductive portions, such as the drive shaft and the applicator cylinder of the transport roller 19A, act as an electrode and are electrically connected to a source of fixed D.C. potential, shown as a battery 19C. Conductive portions of development roller 19B also act as an electrode and are electrically connected to a programmable power supply 19D controlled by the LCU 31. Power supply 19D adjusts the level of $V_B$, the voltage level applied to an electrode located in the station 19.

The copier 1 also includes a transfer station shown as a corona charger 21 at which the toner image on web 5 is transferred to a copy sheet S'; and a cleaning station 25, at which the photoconductive surface 9 of the photoconductive layer 16' is cleaned of any residual toner particles remaining after the toner images have been transferred. After the transfer of the unfixed toner images to a copy sheet S', such sheet is transported to a heated pressure roller fuser 27 where the image is fixed to the copy sheet S'.

As shown in FIG. 1, a copy sheet S' is fed from a supply 23 to continuously driven rollers 18', (only one of which is shown) which then urge the sheet against a rotating registration finger 32 of a copy sheet registration mechanism 22 and the sheet buckles. When the finger 32 rotates free of the sheet, the driving action of the rollers 18' and release of the sheet buckle cause the copy sheet to move forward onto the web 5 in alignment with a toner image at the transfer station 21.

To coordinate operation of the various work stations 17, 18, 19, 21, and 25 with movement of the image areas on the web 5 past these stations, the web has a plurality of perforations along one of its edges. These perforations generally are spaced equidistantly along the edge of the web 5. For example, the web 5 may be divided into six image areas by F perforations; and each image area may be subdivided into 51 sections by C perforations. The relationship of the F and C perforations to the image areas is disclosed in detail in commonly assigned U.S. Pat. No. 3,914,047. At a fixed location along the path of web movement, there is provided suitable means 30 for sensing web perforations. This sensing produces input signals into the LCU 31 which has a digital computer, preferably a microprocessor. The microprocessor has a stored program responsive to the input signals for sequentially actuating then de-actuating the work stations as well as for controlling the operation of many other machine functions as disclosed in U.S. Pat. No. 3,914,047.

SCREEN OPERATION

As is shown in Paxton U.S. Pat. No. 4,294,536, a half tone screen may be included as an integral part of the photoconductive web 5, such as illustrated in FIG. 3. It is often advantageous to activate the screen when a document sheet contains a continuous tone image or a large area of uniform density.

As previously described, image exposure is effected by flash lamps 3 and 4, which forms a latent electrostatic image of the document sheet on the web. Formation of a plurality of charge islands within the latent electrostatic image is effected by second uniform exposure through the rear of the web and through the integral halftone screen 13' formed in the web. This rear exposure may be carried out prior to, simultaneous with, or after image exposure of the photoconductor, the only requirement being that this rear exposure be carried out after charging and prior to development. A plurality of flash lamps 83 are shown to provide this rear exposure and activate the screen 13' and are energized by an adjustable power supply 84 which, in turn, is operated by the LCU 31. The output of the power supply can be varied to change the exposure of the lamps 83. The lamps 83 provide a uniform rear exposure through the screen 13' and serve to at least partially discharge all areas of the photoconductive layer 16' directly opposite transparent areas of the screen 13' (see FIG. 3) thereby forming a plurality of very small charge islands on the photoconductive layer 16'. The amount of exposure used to form these charge islands is varied according to a variety of factors including the nature of the photoconductive layer, type of developer, and mode of development.

Logic and Control Unit (LCU)

Programming of a number of commercially available microprocessors such as INTEL model 8080 or model 8085 microprocessor (which along with others can be used in accordance with the invention), is a conventional skill well understood in the art. This disclosure is written to enable a programmer having ordinary skill in the art to produce an appropriate control program for the microprocessor. The particular details of any such program would, of course, depend on the architecture of the designated microprocessor.

Turning now to FIG. 2, a block diagram of logic and control unit (LCU) 31 is shown which interfaces with the copier 1 and the feeder 51. Leads 144 from feeder 51 provide inputs to and receive outputs from LCU 31 to synchronize the operation of the feeder. The LCU 31 consists of temporary data storage memory 32, central processing unit 33, timing and cycle control unit 34, and stored program control 36. Data input and output is performed sequentially under program control. Input data are applied either through input signal buffer 40 to a processor 42 or to interrupt signal processor 44. The input signals are derived from various switches, sensors, and analog-to-digital converters. The output data and control signals are applied to storage latches 46 which provide inputs to suitable output drivers 48, directly coupled to leads. These leads are connected to the work stations and to a copy sheet registration feeding mechanism 22. Interrupt signals are provided by copy buttons 73, 74, 75, 76, 78, and 80 shown in more detail in FIG. 4. Information representing a particular set of a matrix array is designated by exposure knob 70 and contrast knob 72 which provide inputs to buffers 40 via their respective analog/digital converters (not shown). For convenience of illustration, a copier keyboard 35 is shown connected to the interrupt signal processor 44. This keyboard 35 can conveniently be located on the operator control panel, and all its buttons provide inputs into LCU 31. In response to an input from the starred (*) button, the LCU 31 controls the solenoid 140' which positions the sheet diverter 140 as will be described shortly.

Returning now to the microprocessor, stored in memory is a matrix array such as shown in FIG. 11 of the above-identified Fiske et al patent application. This matrix is in a digitized format, located in stored program control 36, provided by one or more conventional Read Only Memories (ROM). The ROM contains operational programs in the form of binary words corresponding to instructions and values. These programs are permanently stored in the ROM and cannot be altered by the computer operation.

The temporary storage memory 32 may be conveniently provided by a conventional, Read/Write memory or Random Access Memory (RAM).

The copier operating set-up procedure for operating apparatus in accordance with the invention will be described later under the section entitled: SET-UP.

Contrast and Exposure Control ($V_o$, $E_o$, and $V_B$)

For a detailed explanation of the theory of copier contrast and exposure control by controlling $V_o$, $E_o$, and $V_B$, reference may be made to the following article: Paxton, Electrophotographic Systems Solid Area Response Model, 22 Photographic Science and Engineering 150 (May/June 1978). To facilitate understanding, the following terms are defined:

$V_B$ = Development station electrode bias.
$V_o$ = Initial voltage (relative to ground) on the photoconductor just after the charger 17.
E = Actual exposure of photoconductor. (Light produced by the flash lamps ($E_o$) is reflected off of a portion of a document having a particular density Din onto the photoconductor and causes a particular level of exposure E of the photoconductor.

Contrast and density control is achieved by the choice of the levels of $V_o$, $E_o$, and $V_B$. An operator, by adjusting knobs 70 and 72, can designate copier process parameters which define contrast and density for a copy of a particular document sheet. The operation is described in detail in the above-identified Fiske et al patent application.

Operator Controls

Figure 4:
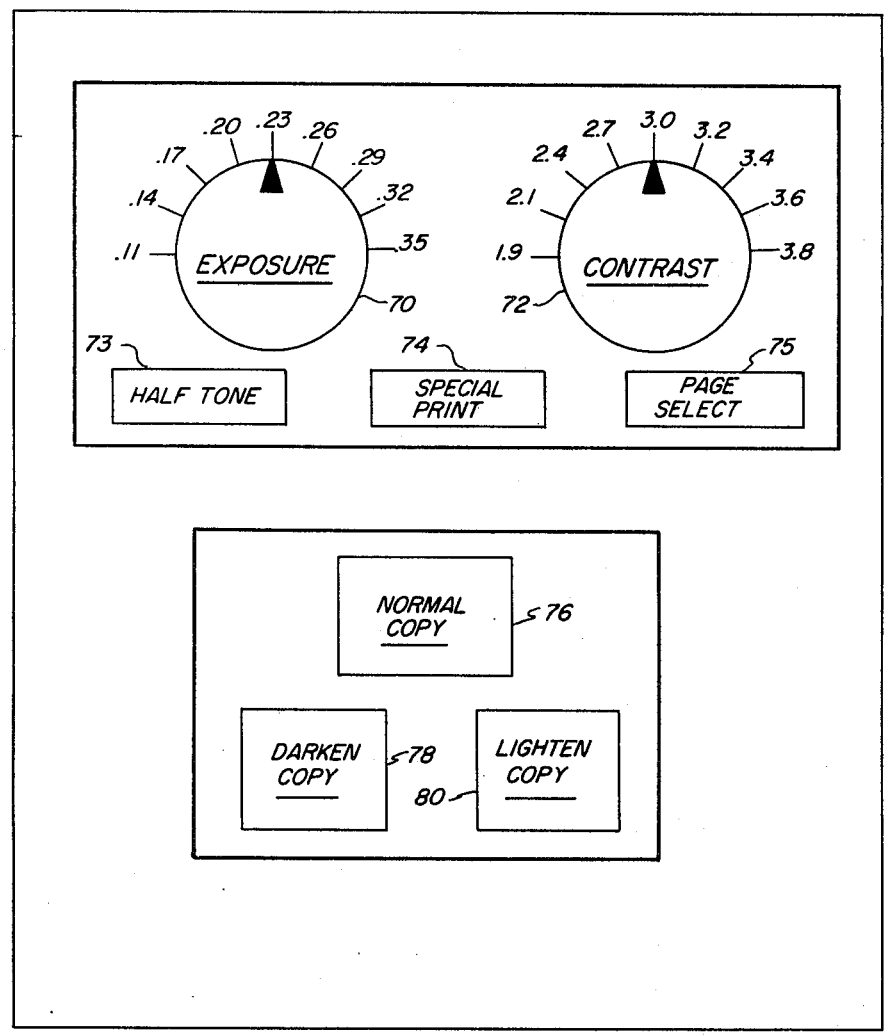
FIG. 4 shows copier controls for operating the copier of FIG. 1.

In FIG. 4, the operator controls include two rotary knobs, exposure knob 70 and contrast knob 72, the half-tone button 73, the special print copy button 74, and the page select button 75. These controls are in addition to the normal, darken and lighten copy buttons 76, 78, and 80 usually found on copiers. Both knobs 70 and 72 have nine discrete positions. The two control knobs 70 and 72 correspond to eighty-one sets of copier process parameters which in turn correspond to different Din/Dout response curves. The first knob 70 functions as an exposure control and translates the breakpoint of the Din/Dout curve.

To activate the screen 13', an operator first depresses half-tone button 73. Thereafter he depresses the special print button 74. The depression of button 74 also causes the copy to be produced in accordance with the Eo, Vo and $V_B$ conditions specified by the knobs 70 and 72. In their respective positions 0.23 and 3.0, (normal copy) shown in FIG. 4, they are set to establish a set of copier process parameters ($V_o$, $V_B$, $E_o$) which condition the copier to produce a copy having acceptable contrast and density for a given document sheet. The knobs 70 and 72 can be adjusted to change the copy contrast and density whether or not it is desired to activate the screen 13'.

If one of the normal, darken or lighten copy buttons is depressed, the computer ignores positions of the knobs 70 and 72, and a Din/Dout response curve corresponding to the normal, darken or lighten copy button designated will be produced. By means of this arrangement, a casual operator can choose to make copies by the conventional normal, darken or lighten copy button selection method.

Set-Up

In operation, an operator depresses the starred (*) button, FIG. 2. This button calls up a special program in stored program control 36 for operating the recirculating feeder 51 and the positioner 86 to feed document sheets to the tray 92. This program conditions the LCU 31 to drive positioner rollers 111 and energizes the solenoid 140' which positions the diverter 140 in the FIG. 5 position. The feeder apparatus is now conditioned to operation in its third mode of operation.

In accordance with the procedure of this program, if an operator determines that the copy process parameters ($V_o$, $V_B$, $E_o$) established when control knobs 70 and 72 are at normal copy positions 23 and 30 respectively, will condition the copier to produce a copy of a document sheet which has acceptable contrast and density, then this document sheet is directly delivered to the tray 92. However, if the operator determines that these process parameters must be changed for an acceptable copy to be made, the document sheet is stopped at the exposure platen 2 and a number of copies made until a proof copy of acceptable contrast and density is made. For sake of illustration, let us assume the last document sheet of a document will make an acceptable copy with a Din/Dout curve corresponding to the normal copy positions of knobs 70 and 72. The operator feeds this last document sheet from the multi-sheet document onto the tray 200 into the rollers 111. The sheet is delivered past switch 67' which produces an input signal to the LCU 31 which keeps a cumulative count of the number of such signals in memory 32. The sheet is delivered past the platen 2 along paths 134, 154 into the tray 92. Let us now assume that the operator determines that the very next document sheet needs special contrast and density adjustments. Before he feeds the document sheet, he depresses button 75, which causes the block 60 to move into a blocking position. The operator then feeds the document sheet into rollers 111 which deliver it to the platen 2. In response to the document sheet being delivered past switch 67', the cumulative count is incremented. The operator then adjusts knobs 70 and 72 and makes copies of the document sheet by depressing button 74. If the document sheet is, for example, a photograph, he would decide that the half tone screen 13' should be activated. To activate the screen, he depresses button 73. A copy is now made by depressing button 74. Let us assume, in this example, the screen improves the contrast but the copy still has some objectionable background; he then further adjusts knobs 70 and 72, depresses button 73 and depresses button 74 making another copy. Assuming now that this proof copy has acceptable contrast and density, the operator depresses the button 75. In response to this button being depressed, the LCU 31 enters into temporary memory 32 all the processing parameter information, i.e., activate screen, and the position (selected by knobs 70 and 72) in the matrix array corresponding to desired Vo, Eo, and $V_B$ values and the numbered position of this document sheet in the document. The LCU 31 then removes the gates 60 from its blocking position and the document sheet is delivered to the tray 92. The above process is repeated for each sheet of the document. Finally, when all of the document sheets are in the tray 92, the operator depresses the * button and the LCU 31 recognizes that all the document sheets are in the tray 92.

The copier is now ready for a production run. The special program in memory is structured so that when the print button 74 is depressed, the recirculating feeder and copier operate to produce a production run of collated copies of the multi-sheet document with copies corresponding to each document sheet needing contrast and density adjustments being in accordance with the stored parameters in memory and the remaining copies having normal contrast and density. Commonly assigned U.S. Pat. No. 4,294,536 discloses the operation of a recirculating feeder 51 and a copier controlled by a logic and control unit to make such a production run. The recirculating feeder operation will be briefly reviewed. The feeder 51 enables the copier to make either collated or non-collated copy sets in a production run. In the feeder, there is a sensor 67, a microswitch, which is disposed adjacent to feed rollers 102 located near the tray 92 which receives the document stack. When a document sheet passes this position, the switch 67 is closed and applies a signal to the LCU 31. After a sheet is delivered by the rollers 102 to the exposure platen, it is stopped by block 60 and flash exposed by lamps 3 and 4. Thereafter, it is returned to the top of the document stack. The signal provided by switch 67 is provided as an input to the LCU 31 which counts and provides an input to the temporary memory 32 which stores a cumulative total count. For a document sheet which requires a Din/Dout curve corresponding to the normal copy pattern of the knobs 70 and 72, the LCU 31 adjusts Vo, Eo, and $V_B$ as disclosed in accordance with the "normal" values. When a particular sheet, which has copier processing parameter information corresponding to it stored in temporary memory 32, passes by the switch 67, the LCU 31 activates the screen 13' by energizing lamps 83 and/or makes adjustments to vary other copier process parameters. Such other adjustment can be the voltage Vo, the copier exposure Eo, and the development station electrical bias $V_B$ as disclosed in the above-identified Fiske et al patent application. The document sheet is then exposed and returned to the stack. The LCU 31 then adjusts the copier, returning it to a normal copy making mode of operation. The document sheet feeding and copying process is repeated until all such sheets are copied, the desired number of times.

The invention has been described with particular reference to a preferred embodiment thereof, but it will be understood that variations and modifications can be effected within the spirit and scope of the invention.

What is claimed:

1. Apparatus including a copier having an exposure station and a feeder for feeding a multi-sheet document one sheet at a time from a stack in the feeder to the exposure station said copier to produce copies of the document; said apparatus comprising:

control means for establishing a set of copy process parameters which condition said copier to produce a copy having acceptable contrast and density for any document sheet which exhibits contrast and density encompassed within a predetermined range of contrast and density, and these document sheets hereinafter being referred to as document sheets of the first kind;

means for adjusting said control means to establish a different set of parameters for each document sheet exhibiting contrast and density outside of such range, and these document sheets hereinafter being referred to as document sheets of the second kind, to condition said copier to produce a proof copy thereof which has acceptable contrast and density;

transport means for feeding seriatim to said stack document sheets of the first and second kinds, which document sheets are intermixed in said document, said transport means including means for presenting for exposure at said exposure station prior to movement to said stack, each document sheet of the second kind for the purpose of producing said proof copy thereof and means for feeding document sheets of the first kind to the stack without presenting for exposure at said exposure station document sheets of the first kind;

memory means coupled to said adjusting means and to said transport means for storing information which identifies the sequential positions of and the established sets of parameters for the document sheets of a document for which said copier was conditioned to make proof copies; and logic and control means operatively associated with said memory means for operating said feeder and said copier and for controlling said adjusting means so that said copier produces copies of the multi-sheet document having acceptable contrast and density.

2. Apparatus including a copier having an exposure platen and a recirculating feeder for feeding and refeeding a multi-sheet document one sheet at a time from a stack in the feeder to the exposure platen and then back to the stack to enable said copier to produce a plurality of copy sets of the document; said apparatus comprising:

control means for establishing a set of copy process parameters which condition said copier to produce a copy having acceptable contrast and density for any document sheet which exhibits contrast and density encompassed within a predetermined range of contrast and density;

transport means for feeding document sheets seriatim from an input station to said exposure platen and then to the stack in said recirculating feeder and for stopping a document sheet at said exposure platen which has contrast and density outside said range prior to feeding it to the stack without similarly stopping a document sheet which exhibits contrast and density encompassed within the predetermined range;

means for adjusting said control means to establish a different set of parameters for each document sheet exhibiting contrast and density outside of such range to condition said copier to produce a proof copy of each such stopped document sheet which proof copy has acceptable contrast and density;

memory means coupled to said adjusting means, and to said transport means for storing information which identifies the sequential positions and the established sets of parameters for the document sheets for which said copier was conditioned to make proof copies; and logic and control means operatively associated with said memory means for operating said recirculating feeder and said copier so that said copier produces copy sets of the multi-sheet document having acceptable contrast and density.

3. The invention as set forth in claim 2 wherein said copier includes a chargeable photoconductor, and said control means includes charging means for varying the charge voltage Vo applied onto said photoconductor, an exposure station including means for varying the copier exposure Eo and a development station having at least one electrode and bias means for applying bias voltage $V_B$ to said electrode, and said adjusting means includes means for varying Vo, Eo and $V_B$.

4. Apparatus including a copier having an exposure platen and a recirculating feeder which receives a multi-sheet document in a stack which document includes at least one sheet having a copy characteristic that is substantially different from other sheets, said recirculating feeder being effective when operated to sequentially circulate document sheets from the stack to the copier exposure platen for copying and then back to the stack, said copier including adjustable control means for varying at least one copy process parameter to change copy contrast and density, the apparatus further comprising:

(a) memory means;

(b) document positioner means for feeding document sheets seriatim to the stack, said positioner means stopping said one sheet at said exposure platen before it is fed to the stack so that said adjustable control means can be adjusted until a proof copy having acceptable copy contrast and density is produced without similarly stopping said other sheets;

(c) logic and control means coupled to said memory means for causing such memory means to store signals corresponding to (i) said copy process parameter for said one sheet, and (ii) the position of said one sheet in the multi-sheet document; and (d) said logic and control means being responsive after said positioner means has fed the entire document to the stack for operating said recirculating feeder to sequentially feed the sheets of the multi-sheet document to said exposure platen for copying and then back to the stack and for setting said adjustable control means prior to copying said one sheet, whereby said copier produces a copy set of the multi-sheet document, with each copy sheet having acceptable contrast and density.

5. The invention as set forth in claim 4 wherein said copier includes a chargeable photoconductor, and said adjustable control means includes adjustable charging means for varying the voltage Vo applied onto said photoconductor an exposure station including adjustable means for varying the copier exposure Eo and a development station having at least one electrode and adjustable bias means for applying adjustable bias voltage $V_B$ to said electrode.

6. The invention as set forth in claim 4 or 5 wherein said photoconductor has an integral screen and said adjustable control means includes exposure producing means for activating said screen.

7. A method of operating a recirculating feeder having a support member, a positioner, and a copier having an exposure station and a photoconductor to make a production run of a multi-sheet document having document sheets arranged in a predetermined order, comprising the steps of:

(a) operating said positioner to feed all the document sheets of the multi-sheet document seriatim to the support member, presenting those document sheets at the copier exposure station which have a copy contrast characteristic substantially different from other document sheets in said multi-sheet document and making a proof copy thereof and determining copy process parameters for such differnet sheets before feeding them to the support member, and feeding said other document sheets from said positioner to said support member without making a proof copy of said other document sheets;

(b) operating said recirculating feeder to automatically circulate document sheets seriatim from the support member to the exposure station of the copier and forming latent electrostatic images of such document sheets on image areas of the photoconductor and returning such sheets to the support member;

(c) automatically setting the determined copy process parameters for such different document sheets prior to forming latent electrostatic images of them;

(d) developing said latent electrostatic images; and (e) transferring such developed images to image receiving mediums such as copy sheets.

8. The method of claim 7 wherein said photoconductor includes a screen and further including the step of:

(f) exposing said photoconductor before, during, or after forming one of said images which corresponds to a different document sheet to activate said screen.

* * * * *

UNITED STATES PATENT AND TRADEMARK OFFICE
CERTIFICATE OF CORRECTION

PATENT NO. : 4,451,137

DATED : May 29, 1984

INVENTOR(S) : Ronald W. Farley

It is certified that error appears in the above—identified patent and that said Letters Patent is hereby corrected as shown below:

In Claim 1, line 4 (column 10, line 13)

after "station", add --to enable--.

Signed and Sealed this

Twelfth Day of August 1986

[SEAL]

Attest:

Attesting Officer

DONALD J. QUIGG

Commissioner of Patents and Trademarks